… … …

United States Patent [19]

Yen et al.

[11] 4,157,923

[45] Jun. 12, 1979

[54] SURFACE ALLOYING AND HEAT TREATING PROCESSES

[75] Inventors: Chia M. Yen, Plymouth; Uck I. Chang, Farmington Hills, both of Mich.

[73] Assignee: Ford Motor Company, Dearborn, Mich.

[21] Appl. No.: 722,965

[22] Filed: Sep. 13, 1976

[51] Int. Cl.$^2$ .................. C22C 37/00; B23K 9/00; B23K 26/00

[52] U.S. Cl. ..................... 148/4; 148/159; 219/121 L; 219/121 LM; 427/53; 427/383 D

[58] Field of Search ........... 148/4, 145, 178, 179, 148/159; 75/65 EB, 135; 427/34, 96, 53, 34, 38, 37, 42, 43, 46, 383 D, 226; 250/492 R, 492 B; 219/121 L, 121 P, 121 EB, 121 EM, 121 LM

[56] References Cited

U.S. PATENT DOCUMENTS

| | | | |
|---|---|---|---|
| 2,902,583 | 9/1959 | Steigerwald | 75/65 EB |
| 3,802,927 | 4/1974 | Gomada | 148/4 |
| 3,806,380 | 4/1974 | Kitada et al. | 148/159 |
| 3,834,947 | 9/1974 | Swoboda et al. | 148/4 |
| 3,839,618 | 10/1974 | Muchlberger | 219/121 P |
| 3,850,698 | 11/1974 | Mallozzi | 148/4 |
| 3,872,279 | 3/1975 | Fairbairn | 219/121 P |
| 3,935,417 | 1/1976 | Umino et al. | 219/121 P |
| 3,944,443 | 3/1976 | Jones | 219/121 P |
| 3,952,180 | 4/1976 | Gnanamuthu | 219/121 LM |
| 3,989,512 | 11/1976 | Sayce | 219/121 P |
| 3,992,164 | 11/1976 | Fengler | 427/53 |
| 4,015,100 | 3/1977 | Gnanamuthu et al. | 219/121 LM |

FOREIGN PATENT DOCUMENTS

| | | | |
|---|---|---|---|
| 2134662 | 1/1973 | Fed. Rep. of Germany | 148/4 |
| 1392812 | 4/1975 | United Kingdom | 148/4 |

*Primary Examiner*—L. Dewayne Rutledge
*Assistant Examiner*—Peter K. Skiff
*Attorney, Agent, or Firm*—Joseph W. Malleck; Olin B. Johnson

[57] ABSTRACT

A method is disclosed for increasing physical properties of a non-allotropic metal article along a beam affected zone. A preferred method comprises passing a high energy beam (of at least 10,000 watts/cm$^2$ measured at the interface of the beam with the article across a predetermined surface area at a rate to cooperate with the proportioning of the total article mass with respect to the beam affected zone mass to produce a rapid self-quenching rate and thus assure a desired precipitate and/or intermetallic compound in the resolidification zone. The high energy beam is preferably a laser generated by a device having a power level of at least 500 watts. The method requires and facilitates alloying which may be varied in several respects: (a) alloying ingredients may be previously deposited over the beam affected zone so as to be turbulently mixed with melting of the base material in said zone, (b) alloying ingredients may be constituted as a wire and fed into the high energy beam to be contemporaneously melted with the base material, (c) the alloying ingredients are selected as those having an affinity to form intermetallic compounds with the non-alloptropic metal base, such as copper, manganese, chromium, zinc, cobalt, magnesium, molybdenum, titanium, vanadian, tungsten, zirconium, iron and nickel for an aluminum base and silicon as an independent wear resistance particle, and (d) the alloying ingredients are proportioned with respect to the thickness of the melted zone to render a desired alloy concentration after melting to facilitate greater hardness, greater corrosion resistance, or greater fatigue life of the affected surface region of the article.

17 Claims, 14 Drawing Figures

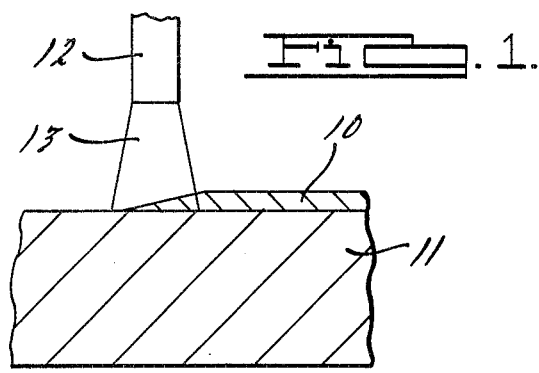
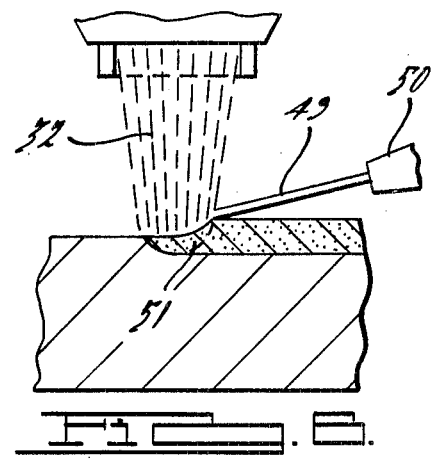
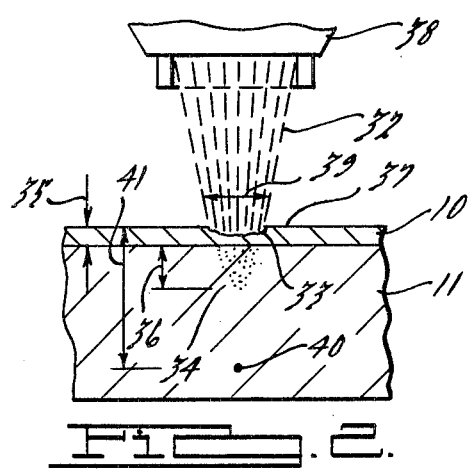
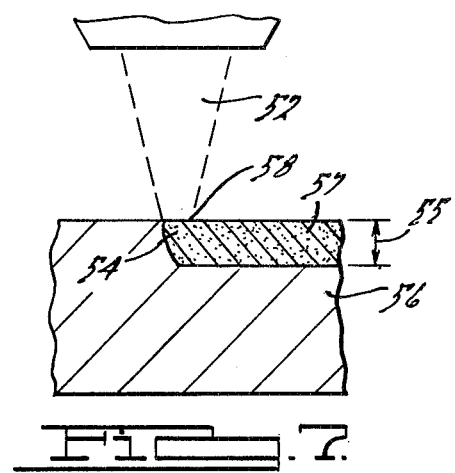
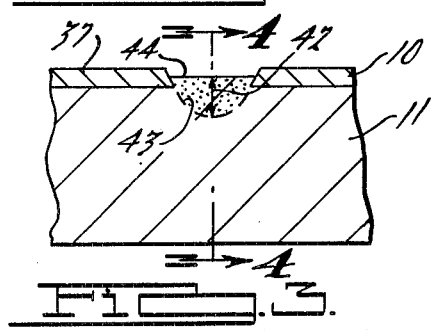
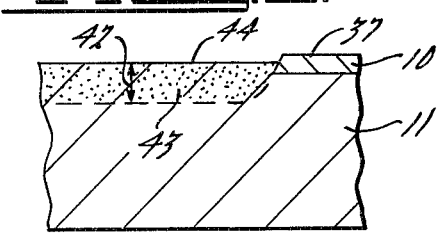
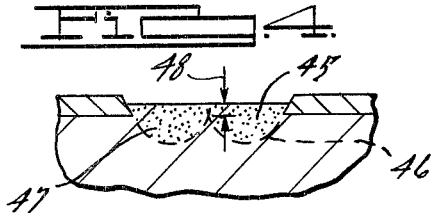
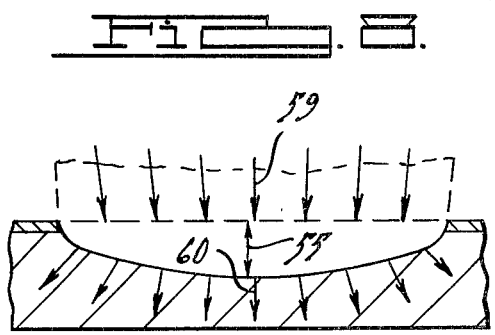

SURFACE ALLOYING AND HEAT TREATING PROCESSES

BACKGROUND OF THE INVENTION

In many industrial applications, it is desirable to produce articles having an inexpensive and lightweight material constituting the core; such materials will typically be non-allotropic metals including aluminum. As earlier indicated, non-allotropic metals shall mean herein non-transformation hardenable metals having a hardness less than $R_c$ 25. The surface of such articles must also possess and have physical properties not provided by the core material itself. Such enhanced physical properties may include high hardness, high strength, elevated temperature wear resistance, and corrosion resistance.

Some form of new surface treating technology must be generated to achieve such properties in a precisely selected surface zone without affecting the non-allotropic metal core; it cannot be achieved reasonably economically by applying presently known surface treating technology. Known treating technology comprises: (a) saturating the surface zone, as by carburizing or nitriding, (b) transforming the surface zone solidification phase to one which is harder, (c) attaching a coating, or (d) alloying or heat treating the entire article. Nitriding and carburizing are employed with success for iron-base substrates, but are not successful with non-ferrous materials. Transformation hardening is quite successful with iron-base substrates, but it is not successful with aluminum and many other non-allotropic materials. Attached coatings are expensive and may lack permanence. Treating the entire article is wasteful of energy, is low in productivity and fails to achieve differential characteristics in the core and surface zone. For example, with an aluminum article and the like, the prior art has principally employed precipitation hardening throughout the entire article. This method is unsatifactory for a variety of reasons including high cost, distortion, and low productivity. Little or no work has been performed with respect to surface region treatments of aluminum and no work has been performed with respect to utilizing a highly concentrated energy beam as one of the factors in such surface treatment technology.

High intensity energy heat sources have been employed for purposes of welding, cutting and drilling, and in certain limited modes for the purpose of surface hardening of ferrous-based materials. The high energy beam can be employed to melt a very shallow surface region of an iron based article with the result that the melted material can be transformed to a harder phase upon removal of the energy beam, allowing the article to perform as a self-quenching medium. However, the technique of using a high energy beam for surface hardening ferrous-based material is totally different than its use when applied to non-ferrous and particularly non-allotropic materials.

Little or no thought has been given to the concept of controlling the introduction of alloying ingredients to controlled depths and proportions within a non-allotropic metal base, such as aluminum, by the use of a high energy beam. The lack of investigation may be attributed to the prevailing thought that the usefulness of such a beam, when applied to aluminum, would be limited because (a) melting typically does not lead to a hardened transformed phase within such material, (b) past experience with furnace heat treatment indicated limited hardness levels to which many non-allotropic metals could be hardened, (c) the lack of commercial need to investigate how to deep harden localized zones with little distortion, and (d) the availability of alternate hardening techniques for commercial needs which usually were shallow non-severe wear surfaces, one technique being plasma spraying which did not distort the substrate and was very flexible in use. Thus, utility of a highly concentrated energy beam had not been envisioned in applications involving aluminum and the like.

Particularly with respect to aluminum, one or more of the following disadvantages may occur with present technology: (a) the article may be highly distorted as a result of the hardening treatment, (b) the surface contour of the part to be treated may be irregular and therefore is not susceptible to uniform treatment or the article may have different sections and the different sections respond differently to the hardening treatment causing non-uniformity, (c) the cost of hardening an aluminum article may be relatively high due to the requirement for expensive equipment or manpower, (d) the method of heat treatment is unable to achieve a shallow uniform case depth with accuracy, (e) the method of treatment is unable to achieve selective precision patterns of case hardening over a given surface, (f) the prior art method is unable to economically harden a small area of a large sized article, (g) the prior art method is unable to harden small areas which are difficult to reach within a complex part, (h) the prior art method is unable to be used without potential damage of adjacent parts, (i) quenching becomes difficult at best with certain of the prior art methods, and (j) the prior art methods do not lend themselves to extremely high volume and fast rates of production. Accordingly, there is a need for a method of surface treating aluminum articles, and the like, which overcomes the above problems and in addition improves the surface treating technology for non-allotropic materials to facilitate achieving all desirable physical properties with adequate control.

SUMMARY OF THE INVENTION

The primary object of this invention is to provide an improved method for achieving case hardening of metal articles which method is particularly characterized by greater economy; eliminates or reduces distortion resulting from the method of treatment, is suitable for irregular and differentially proportioned parts, and is effective to work with a variety of metal substrates that normally do not respond to prior art treatments.

Another object is to provide a method which constitutes essentially localized casting and permits treating a precisely selected exposed zone of a non-allotropic metal article to achieve physical properties in said zone heretofore unattainable and at a higher productivity rate.

Another object of this invention is to provide a versatile method of improving the physical characteristics of a selected surface zone of a non-allotropic metal by controlled remelting in the presence of proportioned alloying ingredients, the characteristics being enhanced according to the desired application.

Another object is to harden metal by integrating thereinto an alloy rich surface region controlled in width and depth and to a precise zone facilitating pattern alloying or total surface coverage.

Features pursuant to the above objects comprise the use of (a) a highly concentrated energy beam presenting an energy level at the interface with the article of at least 10,000 watts/cm², the beam may be either defocused or oscillated to cover an effectively greater controlled zone and the beam is employed to rapidly melt a restricted zone of the substrate to create a turbulence in the molten metal facilitating alloying if desired, (b) relatively rapid movement of the concentrated energy beam so that upon removal of the beam from said restricted zone or station, the mass of surrounding non-allotropic material quenches the heat affected zone by conduction, (c) presenting one or more alloying agents to the interface between the concentrated energy beam and non-allotropic article so that the beam affected zone becomes saturated with said alloying agents and intermetallic compounds are formed, if desired, with a metallurgical bond promoted between the alloyed zone and base metal, (d) a laser for the energy beam while adjusting the power level of the laser beam in relation to the rate of movement of the beam to provide for a predetermined depth of beam affected zone, (e) alloying agents supplied as a powdered material previously sprayed such as by plasma or brushed on and/or fed simultaneously with a proper resin onto the base alloy, or supplied by use of feeding an alloying wire or foil into the beam adjacent the interface between the beam and base alloy, whereby the base alloy may be melted simultaneously with the alloy, and (f) aluminum or an aluminum alloy as the substrate and an alloying agent which has an affinity to form an intermetallic compound with aluminum.

SUMMARY OF THE DRAWINGS

FIG. 1 is a schematic sectional illustration of one early step in practicing a preferred method mode of the present invention; the method mode involves alloying a case onto a metal substrate;

FIG. 2 is a schematic sectional illustration of a subsequent step for the method mode of FIG. 1, particularly involving the melting of both an alloy layer and a subjacent zone of the base metal;

FIG. 3 is a schematic sectional illustration of the resulting product from practicing the steps of FIGS. 1 and 2, the product having been subjected to a single pass of the melting apparatus;

FIG. 4 is a sectional view taken substantially along line 4—4 of FIG. 3 illustrating the depth and continuity of the single pass;

FIG. 5 is a sectional view similar to FIG. 3 but showing the result of a multiple overlapping pass of said melting apparatus;

FIG. 6 is a schematic sectional view, similar to that of FIG. 2, showing an alternative mode of carrying out the first and second steps simultaneously;

FIG. 7 is a schematic sectional view of another process mode of this invention directed to heat treatment with no surface alloying;

FIG. 8 is an enlarged schematic view of a portion of the workpiece operated upon by the method of FIG. 7 showing the flow of energy input and energy dissipation;

DETAILED DESCRIPTION

Figure 9:
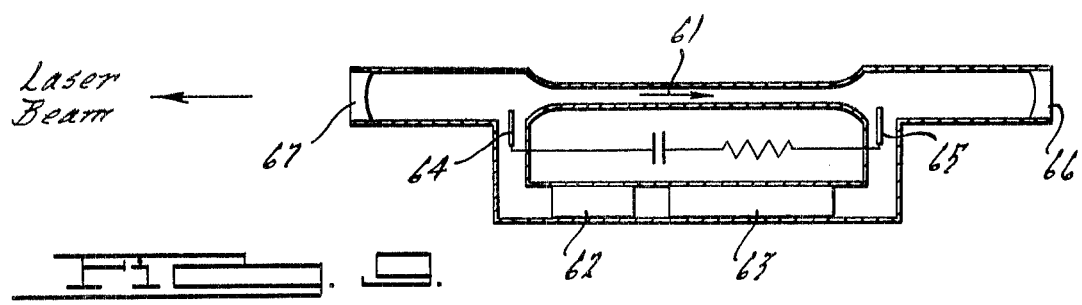
FIGS. 9-11 schematically depict different laser generating apparatus useful with this invention.

The general concept of this invention is to obtain enhanced physical properties in a treated zone along the outer region of an article constituted of a non-allotropic metal (of sufficiently high thermal conductivity) without detrimentally affecting the remainder of the article. Non-allotropic is defined herein to include non-transformation hardenable metals having a hardness below $R_C$ 25. The treated zone is typically arranged to be extremely small in comparison to the mass of the article for cost-saving benefits. The method comprises essentially heating and cooling. Heating consists of concentrating a high energy beam and directing such beam toward a delimited zone of the surface of the article at predetermined scan rate and energy level measured at the article interface so as to melt the metal in said zone at a sufficiently fast rate thereby isolating the remainder of the article from the heat up effect. Cooling consists of removing the high energy beam from said zone while proportioning the mass of said article with respect to the beam affected zone to provide a self-quenching cooling rate which insures a fine grained structure and a supersaturated solid solution. The supersaturated solution can be promoted by either diffusing independent alloying ingredients into said zone for a controlled dilution of the metal or by selecting an alloyed base metal having a minimum level of inherent alloying ingredients for supersaturation.

The most notable advantage achieved by practicing such method is the capability of deploying a relatively economical light substrate material, such as aluminum, and the capability of restricting physical property enhancement by isolating use of expensive materials to small selected surface zones, thereby producing an excellent cost/performance ratio.

Surface Alloying

One of the important method modes of employing the general concept provides an alloyed surface zone on the article. Surface alloying is achieved by rapidly melting the selected outer zone of the article as well as an alloying agent deposited previously or simultaneously into said zone. The alloying agent is turbulently mixed into the melted base metal by thermal activity resulting from the action of the beam. Upon quick removal of the high energy beam, a self-quenching operation ensues created a fine grained solid solution alloy with distribution of intermetallic compounds. The creation of such homogeneous surface alloy region is new because at least some investigators, including ourselves and co-workers, thought that such high thermal conductivity non-allotropic metals would lose strength as a result of high energy beam exposure. And yet some others may have thought that the beam affected zone would not be limited adequately to permit self-quenching. It was found that the beam affected zone can be most accurately limited, isolated and controlled without sacrifice of needed heat up rate and self-quench rate.

Turning more specifically to a detailed preferred mode of carrying out surface alloying, reference is made to FIGS. 1-6.

(1) An initial preparatory step of the process is to select a base material which responds to rapid heating by a high energy beam, is easily melted, and will satisfactorily conduct heat during cooling for self-quenching. Although a wide variety of metal materials can be employed, the mode herein is preferably carried out with a base metal consisting essentially of an aluminum alloy. The base material should have a thermal conductivity of at least 0.25 Cal./cm$^2$/cm/sec./° C. Other non-allotropic metals as defined herein and which have a sufficient thermal conductivity comprise: magnesium, copper, zinc and titanium.

(2) The preferred base metal is surface alloyed by the selection and use of alloy ingredients which have an affinity for forming solid solution and intermetallic compounds with the base metal. For aluminum or an aluminum alloy, the ingredient can be selected from the group consisting of: copper, nickel, tungsten, molybdenum, zirconium, vanadium, magnesium, zinc, chromium cobalt, manganese and titanium. Two or more of such ingredients may be added together. Copper is one of the most effective alloying ingredients for hardening aluminum alloys. Nickel facilitates resisting softening of the aluminum at elevated temperatures in the alloyed condition. Silicon, although not forming an intermetallic compound, is useful in an aluminum alloy to produce a low silicon core with wear resistant high silicon surface having independent wear particles. Graphite, although not forming an intermetallic compound, is useful as a high temperature solid lubricant in the alloyed surface area. Alloy ingredients for magnesium may include zinc, rare earth, zirconium, manganese and aluminum. Alloy ingredients for copper may include: lead, zinc, aluminum, tin, iron, nickel, silicon, manganese, beryllium, zirconium and chromium.

(3) The next step is to attach, deposit or subject alloy ingredients to the beam adjacent the selected zone of the base metal. One way this is accomplished is by depositing an alloy layer 10 on the base metal 11 by a suitable mechanism 12 (see FIG. 10), which here includes plasma stream spraying of powdered alloy metal. A preferable mode is to employ a wire comprised of the alloying ingredients and feed such wire into the beam (see FIG. 6). Yet another way is mix resin with the powdered ingredients and deposit such mixture in the path of the beam. Painting may also be employed, as long as the ingredients are attached in a manner to be influenced by the beam. The alloying ingredients, to be sprayed by the plasma technique, can be an admixture of metal powders or can be applied in independent layers. The admixed powders typically will be subjected to a very high temperature and subjected to a jet velocity, however both conditions not being critical to this invention.

The depth of the alloy layer should be controlled to achieve a predetermined alloy concentration of the melted zone of the base metal. The alloying ingredients (whether added or inherent in the base metal alloy) should enrich the base metal melted zone to at least form a saturated solid solution upon remelt. Generally, surface alloying will be directed predominantly at enhancing one of three of physical characteristics (wear, fatigue life, or corrosion resistance) depending on the application and use of the treated article. To provide optimum wear resistance in the treated zone of the article, the alloy ingredients should be added to the melted base metal in said zone in a weight ratio of 1:1 to 1:20. This may be roughly estimated by applying an alloy coating thickness which is equal to or as little as 1/20 the (depth) thickness of the melted base metal. This range of ratios insures the generation of intermetallic compounds in the melted zone upon solidification, which compounds constitute the primary mechanism of this invention to harden non-allotropic base metals via a high energy beam remelt.

To provide optimum fatigue life in the selected surface treated zone, the ratio should range from 1:10 to 1:20 to provide a lean alloy dilution content and insure the avoidance of intermetallic compounds while promoting hardening by precipitation or age hardening.

To provide an improvement in corrosion resistance in the selected surface treated zone, the ratio should be no less than 2:1. It may be preferable to use substantially pure aluminum for the alloying ingredient when the base metal is an aluminum alloy, such as 390 or 355. Purer aluminum has a greater resistance to corrosion than said aluminum alloys.

Figure 13:
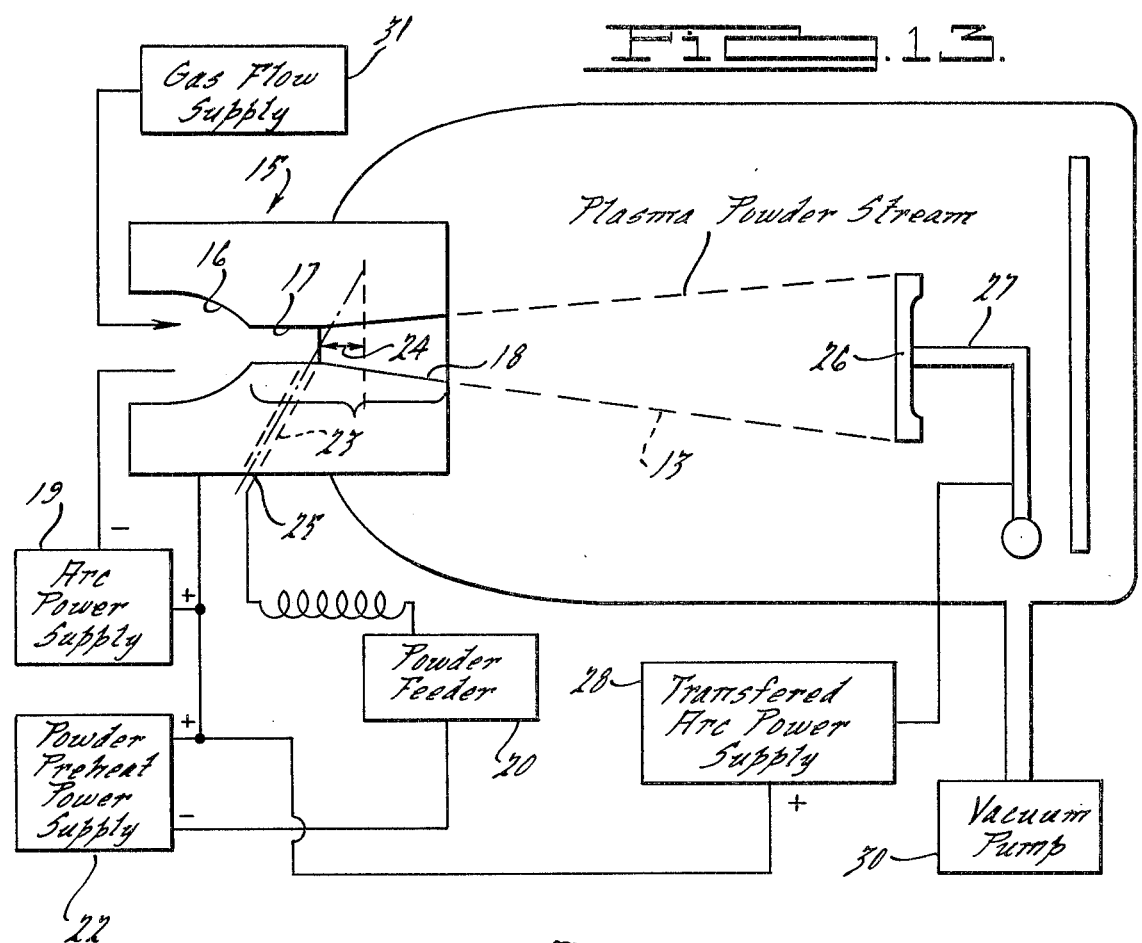
FIG. 13 is a schematic illustration of one type of plasma powder coating apparatus that may be employed in connection with the method of FIGS. 1-3.

A typical apparatus for carrying out the plasma deposition is shown in FIG. 13. The arrangement employs a plasma gun 15 containing a gas arc chamber 16 having an exit throat which has a straight bore section 17 and a diverging section 18. The gas supply 31 is introduced at the left hand portion of the gas chamber 16 and an arc is created across the chamber by virtue of an arc power supply 19. The metallic and refractory powders are introduced to the gun from a powder feeder 20 and carried to a preheating tube 21 which is powered by a powder preheat supply 22; the powder is then conveyed to a precise location in the exit throat by way of a passage 23 which is slightly angled (at 24 with reference to a centerline 25 of the passage) and enters the exit throat precisely at the juncture of the straight bore section and the diverging section. The stream 13 from the plasma gun is directed at the target article 26 to be coated. The article to be coated is carried by movable support 27 so as to allow for the deposition of the powders across a wide selected area or pattern. The workpiece or article 26 is maintained at a specific electrical potential by way of a transferred arc power supply 28 so as to receive plasma spray particles. The entire workpiece, as well as plasma jet, is enclosed in a chamber 29 evacuated by a vacuum pump 30.

(4) As shown in FIG. 2, the next step is to melt by generating, directing and moving a high energy beam. A high energy beam is defined herein to mean a column of radiant energy (regardless of source) having an average power density in excess of 10,000 W/cm$^2$ at the interface with the metal to be treated. This step involves generation of a high energy beam 32 of sufficient power, directing the beam at a selected exposed zone 33 of the article and moving the high energy beam 32 along a predetermined path and at a specific rate so as to not only melt the selected zone of contact between the beam and alloy layer 10 but also to melt a predetermined portion 34 of the subjacent portion of the base metal 11. The beam will affect two zones, first one which is heat influenced without melting and a second zone within the first which is melted. Laser rays initially are slightly retarded by reflectivity from entering a bare aluminum surface; this retardation is lessened by (a) formation of a melted cavity when heat breaks down the surface thereby permitting concentration of the rays and (b) by the application of a powder alloy coating.

Laser rays enter the article at the interface with high energy, but with a defocused beam at least some of that intensity is lost by reflectivity, diffusivity and refraction within the article. However, this favors control of a shallow beam influenced zone.

The heat-up rate of the base metal must be relatively rapid so that (a) turbulence is created within the molten spot pool and (b) removal of the high energy beam facilitates rapid quenching. The absorptive characteristic of the base metal must be controlled to assist entering of the beam rays into the base metal and thereby promote a fast heat-up rate. This necessitates use of a laser beam or an electron beam. It has been found by experimental procedure that to achieve melting of the deposited alloy layer 10 (consisting of silicon, copper, nickel and carbon) having a thickness of 0.006" (35) and to melt the subjacent base metal 11 to a depth of 0.025" (36), the energy imparted to the article at its surface 37 must be about 70,000 watts/cm$^2$ with a beam spot diameter at the interface of 0.08". This can be obtained by use of a laser beam generated by apparatus (disclosed in any of FIGS. 9-11). The definition of a proper high energy laser beam for carrying out surface alloying is critical. The apparatus for generating the beam must have a power rating of at least 1-6 KW to achieve rapid heating and melting with a commercial scan rate of 0.005 in.$^2$/sec. At power levels lower than 1 KW, the beam speed can operably be as low as 0.01"/minute, but this speed is commercially impractical. The beam 32 should be focused to a point 40 located a distance 41 away from the plane of the outer surface 37 of the article (either above or below); thus, the beam is defocused with respect to the interface with the outer surface of the article and has a diameter 39 at said interface which may vary practically between 0.01-0.5" in diameter.

It is important to control interplay of the power level of the high energy beam, the scan speed or relative movement of the beam across the surface 37 of the article, and the spot size of the beam at the interface. Moreover, "controlling" used hereinafter means correlating the beam interface area, scan speed, and beam energy level to achieve a desired melt rate and cooling rate for the beam affected zone. The energy level at the interface should be at least 10,000 watts/cm$^2$; the spot size at the interface can vary from 0.0008 in.$^2$ to 0.05 in.$^2$ or more. The linear speed should be in the range of 10-100"/minute. Proper control of these parameters results in successful temperature distribution in the base metal and successful laser surface alloying.

The resulting alloyed case depth 42 from a single pass is basically proportional to the energy application level used at a given scan rate. The exact values of the power level as related to the scan rate for particular surface alloying material or application will depend upon the alloy coating, the base metal, and the alloyed case depth desired. The resulting depth 42 of the alloyed case or beam affected zone is shown in FIG. 3. The zone for a single pass is represented in cross-section by a semi-spherical filled groove 43 having a solid solution of alloyed metal containing intermetallic compounds. You will note the top surface 44 of the resulting alloyed zone is higher than the original surface of the article.

FIG. 4 illustrates the contour of the single pass along its length. A complete surface of the article may be provided with an alloyed case by (1) establishing multiple passes of a defocused beam and (2) overlapping the zone of influence of each pass so that the beam affected zone 45 will appear as a number of overlapping ribs 46-47 as shown in FIG. 5. The spacing and degree of overlapping of the ribs can be varied to establish a minimum zone depth 48. It is quite possible that the passes may be separated by a wide dimension so that only a pattern of alloyed ribbons or lands may appear on the article, such lands of alloy may provide the necessary wear resistance for the entire surface. In addition, the beam affected zone may be subject to a focused beam (focused at the interface) and pulsated to keep the energy level commensurate with melting.

The preferred apparatus for generating a laser beam is shown in FIG. 9 and comprises a closed $CO_2$ gas flow circuit 61, the gas being moved rapidly by a blower 62 and heat removal by an exchanger 63. The laser discharge takes place axially along the flow path between electrodes 64 and 65. The laser beam discharge is trained in said axial flow direction by totally transmitting mirror 66 and emitted from the laser generator housing through partially transmitting mirror 67.

Figure 10:
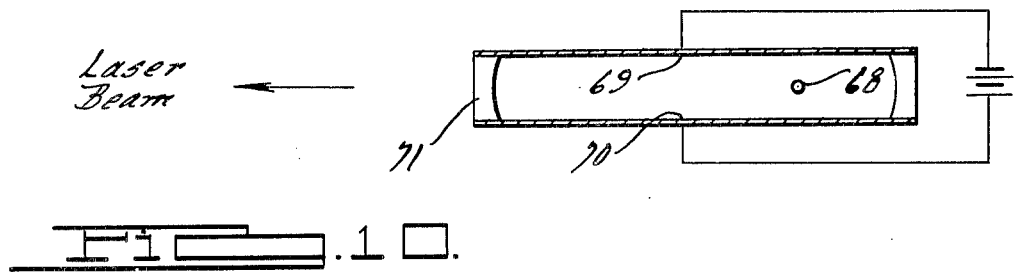

In FIG. 10, there is shown an apparatus for generating a laser beam from gas with a flow 68 transverse to the electrical discharge between electrodes 69 and 70. Mirror 71 is partially transmitting.

Figure 11:
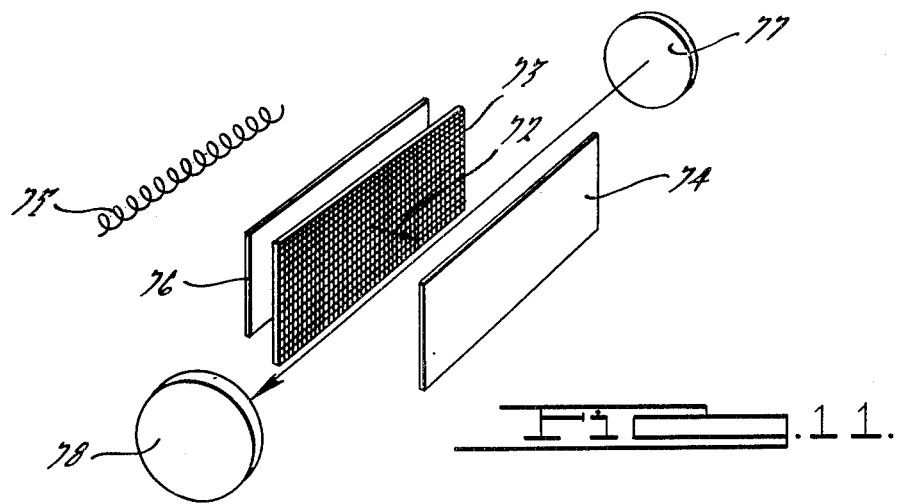

In FIG. 11, there is shown an apparatus for generating a laser by an electron beam 72; sustainer electrodes 73 and 74 are spaced apart in a high vacuum; the electron emitter 75 sends electrons through membrane 76 to the electrodes. Mirrors 77 and 78 cooperate to collect the lasers and transmit them through partially transmitting mirror 78.

Figure 12:
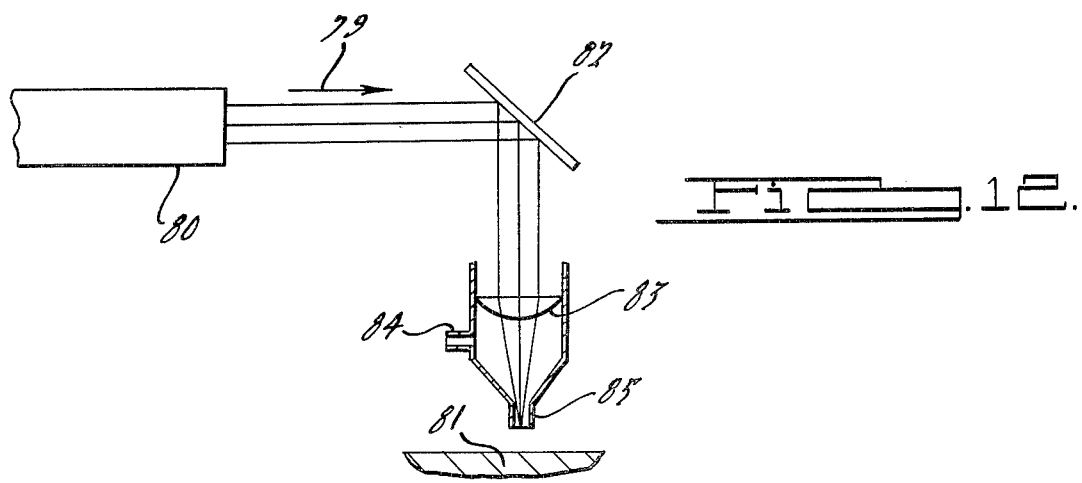
FIG. 12 is a schematic view of a laser concentrating apparatus for directing the beam at an article to be heated.

In FIG. 12, an apparatus is shown for conveying the laser beam 79 from the laser generating apparatus 80 to the article 81 to be treated. The beam is turned by a mirror 82 and gathered by a lens 83 having an assist gas inducted therein at 84. The beam orifice 85 controls the beam spot size at the article interface.

Laser surface alloying is particularly useful in those applications of the prior art where: (a) the surface of an article requires a special alloy composition for wear, corrosion or heat resistance, (b) an irregular pattern on the surface requires a special alloy composition, (c) the required alloy content cannot be produced economically in the cast or wrought condition, (d) different compositions are necessary at different locations of the surface of an article, (e) a metallurgical bond between the special surface layer and the base material is desirable, (f) the heat affected zone in the base material should be minimized, (g) the surface alloying must be accomplished with a minimum heat input to reduce distortion and damage of an adjacent component by excessive heat, and (h) the hardened case should possess a high hardness even at an elevated temperature.

Figure 14:
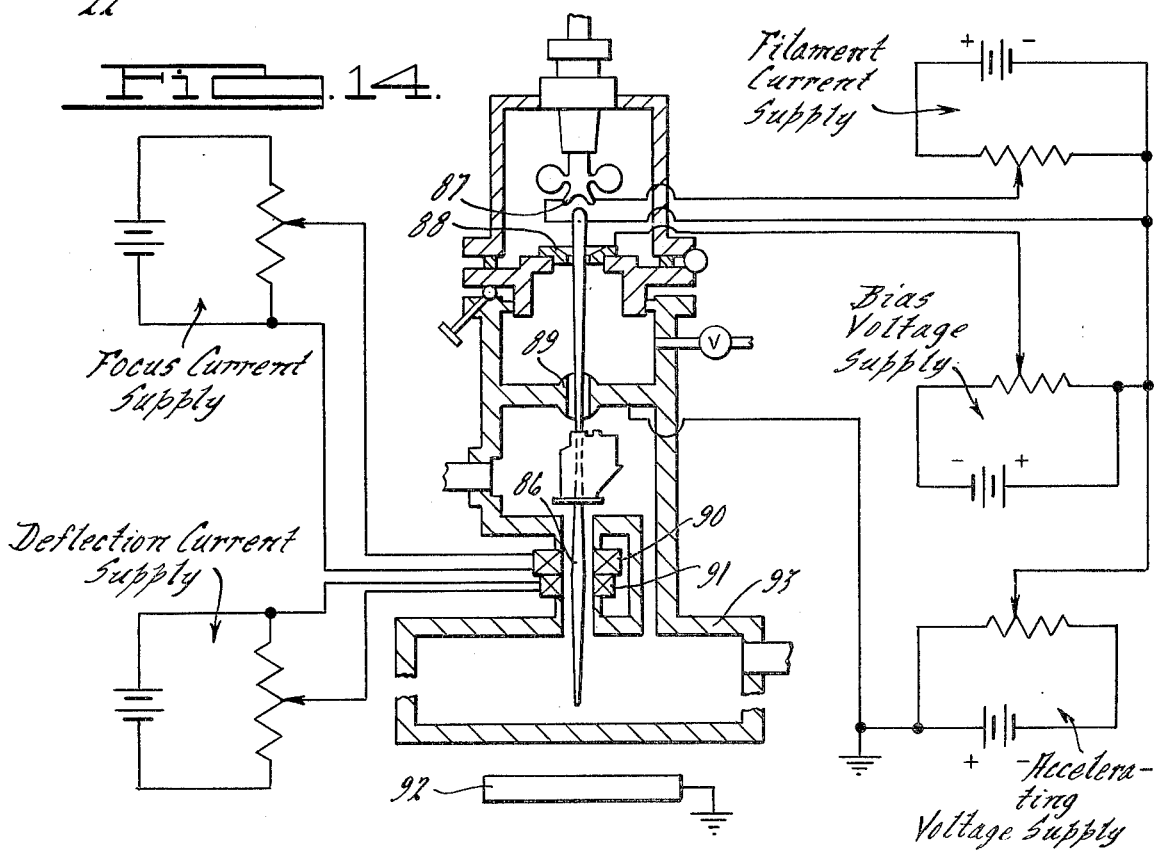
FIG. 14 is a schematic perspective view of one type of electron beam apparatus that may be employed in practicing the invention.

Yet still another apparatus useful in generating a high energy beam for this invention is shown in FIG. 14. The apparatus is an electron gun which transmits a beam of electrons 86 derived from a heated filament or an indirectly-heated cathode 87. The control electrode 88 regulates beam current and voltage of anode 89, and thereby the velocity of electrons in the beam. The product of anode voltage and beam current in beam power. The focus coil 90 controls beam spot size independently so that beam spot size can be adjusted as desired for various values of voltage and standoff. Deflection coils 91 move the beam away from its neutral axis position to direct the beam onto any point on the article 92. Four coils are usually required to deflect the beam in both X and Y directions in the plane of the article. The article and gun share essentially the same vaccum chamber 93.

(5) Lastly the influence of the beam must be removed from a properly melted zone of the article at a sufficiently rapid rate, the mass of the article must be proportioned to the volume of the molten melted zone and the article metal must have been selected with an adequate thermal conductivity to achieve rapid self-quenching and thereby the formation of small particles of intermetallic compounds, when desired or a saturated solid solution, when desired. In almost all cases where the article is a casting and the beam affected zone is ⅛" or less, the mass will be properly proportioned.

Heat Treating

The main purpose of surface heat treatment according to this invention is to improve the surface wear characteristic or fatigue life of non-allotropic metal articles with minimum distortion. This is accomplished by manipulation of a defocused beam or oscillation of a focused beam, both without the use of independent alloying agents, to rapidly remelt the selected zone of the article and self-quench. The mechanism of hardening is grain and particle refinement; this may also result in increased solid solution hardening by rapid quenching which facilitates to obtain super saturated solid solution.

As shown in FIG. 7, heat treatment is carried out by deploying a high energy beam 52 having a power level of at least 10,000 watts/cm² to remelt a typical non-allotropic base metal; the energy is concentrated in a beam so that upon contact with the untreated surface of the article; sufficient energy will heat the interface zone 54 to melting and the base metal to much greater depths (55) typically about 0.25". Such beam can be generated by either a laser or an electron beam apparatus 53. By controlling the rate of movement of the beam, and proportioning the mass of the article 56 with respect to the beam affected zone 54, rapid quenching will take place upon removal of the high energy beam from each beam affected station.

We claim:

1. A method of treating a selected exposed region of a non-allotropic metal article for enhancing the physical properties of said region, comprising:
   (a) selecting the non-allotropic metal for said article having a thermal conductivity of at least 0.25 Cal./cm²cm/sec./°C.,
   (b) directing a high energy beam at an exposed region of said article to heat said article at a first zone and to melt said article at a second zone within said first zone to a predetermined depth, said beam providing an energy level at the interface with said article of at least 10,000 watts/cm²,
   (c) either prior to or simultaneous with directing a high energy beam at said article, introducing a molten alloying ingredient to said second zone to be mixed with the molten metal thereof, said alloying ingredient comprising a material having an affinity for said non-allotropic metal to form a solid solution with intermetallic compounds therewith, and to form precipitate particles, said alloying ingredients being introduced is proportioned to be within the range of 1:1 to 1:10 taken as a ratio of alloying ingredient to melted non-allotropic metal in said second zone.
   (d) controlling the area of said beam interface, beam energy level, and rate of displacement of said beam along said article to restrict said first zone to a predetermined volume and insure a predetermined fast heat-up rate of said first zone, and
   (e) proportioning the mass of said article to the volume of said first zone to provide a fast self-quenching cooling rate of said first zone upon removal of the influence of said beam therefrom whereby a fine grain solution-hardened structure and fine precipitated particles are promoted in at least said second zone.

2. The method as in claim 1, in which said beam interface with said article and the depth of said second zone are each controlled to promote turbulence of the melted metal for thorough mixing of said melted alloying ingredient thereinto prior to solidification.

3. The method as in claim 1, in which said metal article is comprised of aluminum or an aluminum alloy.

4. The method as in claim 3, in which said article mass beneath said first zone has a thickness of at least 5 times the depth of said first zone.

5. The method as in claim 1, in which the high energy beam is comprised of rays controlled like visible light rays, said beam having a focal point out of the plane of the surface of said exposed region whereby the beam interface area with said region is controlled to be at least 0.00003 square inches.

6. The method as in claim 1, in which said beam is pulsated to achieve either an interrupted first zone or to affect a predetermined controlled depth of said second zone.

7. A method of alloying a selected exposed region of a non-allotropic metal article for enhancing the physical properties of said region, comprising the steps of:
   (a) providing a non-allotropic metal casting to constitute said article, said metal having a thermal conductivity of at least 0.25 Cal./cm²/cm/sec./°C.,
   (b) plasma spraying an alloying ingredient onto said exposed region, said alloying ingredient comprising substantially a material having an affinity to form intermetallic compounds with non-allotropic metal,
   (c) directing a high energy beam at said selected exposed region of said article to melt said article along a predetermined zone and to melt an amount of said alloying ingredient proportioned to said zone,
   (d) controlling the area of interface of said beam with said region, beam energy level, and rate of displacement of said beam along said article to restrict said zone to a predetermined volume for insuring a fast heat-up of said zone and to create a turbulence in said melted metal and melted alloying ingredient, the amount of alloying ingredient melted and dissolved in a corresponding melted zone of said article is proportioned to be within the range of 1:10 to 1:20 (alloying ingredient: non-allotropic metal in zone) whereby said zone will have a solidification structure principally providing increased fatigue life characterized by a uniform fine grain structure, absence of intermetallic compounds and a precipitation hardened aluminum matrix promoting age hardening.

8. The method as in claim 1, in which said non-allotropic metal is aluminum based.

9. The method as in claim 7, in which said non-allotropic metal has a reflective surface, said metal casting region being coated with an energy beam absorption material to facilitate absorption of the rays of said beam within said casting.

10. This method as in claim 7, in which said absorptive coating is arranged in a predetermined pattern for selecting treatment of the surface of said metal casting.

11. The method as in claim 7, in which the alloying ingredient is deposited as a coating on said metal casting prior to the application of said high energy beam, said deposition being carried out by plasma stream whereby the alloying ingredient is mechanically and molecularly locked to the surface of said casting along said predetermined zone.

12. The method as in claim 7, in which the alloying ingredient is formed as a wire, said wire being fed into said high energy beam to be melted and carried into said melted zone.

13. The method as in claim 7, in which the alloying ingredients are mixed with resin and brushed on said non-allotropic metal prior to directing said high energy beam at said exposed region.

14. The method as in claim 7, in which the alloying ingredients are in powder form and are fed into said high energy beam to be melted and alloyed with said non-allotropic metal.

15. The method as in claim 7, in which said beam is moved along a plurality of separated and spaced paths whereby the beam affected zones form spaced lands on the exposed surface of said article.

16. A method of alloying a selected exposed region of a non-allotropic metal article for enhancing the physical properties of said region, comprising the steps of:

(a) providing a non-allotropic metal casting to constitute said article, said metal having a thermal conductivity of at least 0.25 Cal./cm$^2$/cm/sec./°C.

(b) placing an alloying ingredient adjacent said exposed region, said alloying ingredient comprising substantially a material having an affinity to form intermetallic compounds with said non-allotropic metal, (c) directing a high energy beam at said selected exposed region of said article to melt said article along a predetermined zone and to melt an amount of said alloying ingredient proportioned to said zone, (d) controlling the area of interface of said beam with said region, beam energy level, and rate of displacement of said beam along said article to restrict said zone to a predetermined volume for insuring a fast heat-up of said zone and to create a turbulence in said melted metal and melted alloying ingredient, the amount of alloying ingredient melted and dissolved in a corresponding melted zone of said article is proportioned to be at least 2:1 (alloying ingredient: non-allotropic metal in zone) whereby said zone will be changed in base and have a solidification structure principally providing increased corrosion resistance.

17. The method as in claim 16, in which said alloying ingredient is aluminum and said non-allotropic metal is an aluminum alloy containing less than 5% of alloying ingredients.

* * * * *